United States Patent
Sederberg et al.

(10) Patent No.: US 7,240,869 B2
(45) Date of Patent: Jul. 10, 2007

(54) LUBRICATING SYSTEM FOR METAL-DEMOLITION SHEARS

(75) Inventors: Clayton P. Sederberg, Duluth, MN (US); Michael W. Swanson, Two Harbors, MN (US)

(73) Assignee: The Stanley Works, New Britain, CT (US)

( * ) Notice: Subject to any disclaimer, the term of this patent is extended or adjusted under 35 U.S.C. 154(b) by 224 days.

(21) Appl. No.: 10/886,052

(22) Filed: Jul. 8, 2004

(65) Prior Publication Data

US 2006/0006260 A1 Jan. 12, 2006

(51) Int. Cl.
B02C 19/00 (2006.01)
B02C 23/02 (2006.01)

(52) U.S. Cl. .................. 241/101.73; 241/266

(58) Field of Classification Search .......... 241/101.73, 241/266; 83/609, 628
See application file for complete search history.

(56) References Cited

U.S. PATENT DOCUMENTS

| | | | | |
|---|---|---|---|---|
| 2,791,383 | A | * 5/1957 | Kjelgaard | .................. 241/290 |
| 2,975,865 | A | * 3/1961 | Rumpel | ...................... 184/7.2 |
| 3,774,858 | A | * 11/1973 | Archer et al. | ............ 241/285.1 |
| 4,384,599 | A | 5/1983 | Dagenais | |
| 4,462,439 | A | 7/1984 | Dagenais | |
| 4,558,515 | A | 12/1985 | LaBounty | |
| 4,771,540 | A | 9/1988 | LaBounty | |
| 4,903,408 | A | 2/1990 | Tagawa et al. | |
| 5,113,733 | A | 5/1992 | Peterson et al. | |
| 5,127,567 | A | 7/1992 | LaBounty et al. | |
| 5,230,151 | A | 7/1993 | Kunzman et al. | |
| 5,322,103 | A | * 6/1994 | Hudson | ................... 144/24.13 |
| 5,384,962 | A | 1/1995 | Pemberton | |
| 5,715,603 | A | 2/1998 | Dorguin | |
| 5,725,163 | A | * 3/1998 | Eloranta et al. | .............. 241/33 |
| 5,769,341 | A | 6/1998 | Morikawa et al. | |
| 5,944,265 | A | * 8/1999 | Ganser et al. | ................ 241/36 |
| 5,992,023 | A | 11/1999 | Sederberg et al. | |
| 6,061,911 | A | 5/2000 | LaBounty et al. | |
| 6,119,970 | A | 9/2000 | LaBounty et al. | |
| 6,354,006 | B1 | * 3/2002 | Castelmani | ................ 30/123.4 |
| 6,363,981 | B1 | * 4/2002 | Butler et al. | ............. 144/24.13 |

OTHER PUBLICATIONS

International Search Report issued for PCT Application No. PCT/US2005/023942, dated Oct. 28, 2005.
"HTL 429 Pump and Electric FlowMaster© Pump", Solutions, The Latest Products and News for Lincoln Customers, Apr. 2003, vol. 5, No. 2, pp. 1-2.

(Continued)

*Primary Examiner*—Faye Francis
(74) *Attorney, Agent, or Firm*—Pillsbury WInthrop Shaw Pittman LLP

(57) ABSTRACT

A lubricating system for a heavy-duty metal demolition shears provides lubricating lubricant to one of more wear parts. The system includes a hydraulic lubricant pump that is actuated by the main hydraulic control system that opens and closes the jaws of the shears. The lubricant pump may include a sequential valve to distribute lubricant to various wear parts in sequential fashion. As disclosed herein, wear parts that may be lubricated by a lubricating system as per the invention include (but are not limited to) lateral blade stabilizers, a guide blade, and cutting blade insert members.

18 Claims, 18 Drawing Sheets

OTHER PUBLICATIONS

"Construction's Best Lubrication Solutions", Capabilities, Information From the Leader in the Lubrication Industry, pp. 3-10.
"Vogel Centralized Lubrication", www.vogelag.com, Feb. 2004.
"Hydralube Lubrication Pump", Interlube, Leaders in Lubrication Solutions.
"Light Hydraulic Breakers", AtlasCopco, pp. 3-7.
HP Series Hydraulic Breakers, Indeco, Your Partners in Demolition.
"Pulverizers Range", Indeco, Your Partners in Demolition.
"360 Degrees Lubricating Grease System and Fitted with Semi-Self Lubricating Bushes", A-Ward Attachments, www.a-ward.co.nz/pdfs/Re-barShear17Feb05v1.pdf.
Stanley Hydraulic Auto Lube Pump Installation, Operation, & Maintenance Manual, pp. 1-12, Form 44869, May 2001.

* cited by examiner

LUBRICATING SYSTEM FOR METAL-DEMOLITION SHEARS

FIELD OF THE INVENTION

The invention relates to heavy-duty machinery having wear parts with wear surfaces that need to be lubricated. More particularly, the invention relates to heavy-duty metal demolition shears and demolition attachments such as multi-jaw processors used in concrete and steel processing and demolition.

BACKGROUND OF THE INVENTION

As illustrated in FIGS. 1 and 2, in general, a heavy-duty metal demolition shears 10 of the sort in which a lubricating system according to the invention may be incorporated has a stationary lower jaw 12 and an upper jaw 14 that pivots about a pivot structure 16 to open and close. A hydraulic cylinder 18 drives the upper jaw 14 to open and close the shears 10. The shears 10 includes upper primary and secondary blade insert members 20 and 22, respectively, attached to seating surfaces on the upper jaw 14, and lower primary and secondary blade insert members 24 and 26, respectively, attached to seating surfaces on the right-hand lower jaw side plate 12b. The blade insert members 20-26 cooperate to cut material being processed with the shears 10 in shearing fashion. The lower jaw includes tow sides and an end plate. The blade side is often referred to as the "cutting side," the opposite side, with the guide blade, is often referred to as the "guide side," and the end plate is often referred to as the "cross plate."

As the shears cut a workpiece, the upper jaw 14 may be deflected somewhat laterally due to the fact that the lines along which cutting forces are applied to a workpiece by the lower and upper jaws 12, 14 are slightly offset with respect to each other. Therefore, a heavy-duty demolition shears may include a wear guide or guide blade 28 attached to a seating surface formed along a slot-facing surface of the left-hand (guide side) lower jaw side plate 12a and a wear plate 30 that is attached to a lateral surface of a front or nose portion of the upper jaw.

Additionally, it is known in the art to provide one or more lateral blade stabilizers (not included in the prior art shears illustrated in FIGS. 1 and 2) that are positioned on either side of the upper jaw, generally near the pivot structure.

As the shears 10 operates, these various wear components, which present various wear surfaces, slide past each other—blade insert members past blade insert members, the wear plate past the guide blade, and the upper jaw past the lateral blade stabilizers. As they do so, they can wear each other down. Accordingly, it is known to lubricate the various wear surfaces that make sliding contact with each other. Traditionally, such lubrication has been done manually. That, however, necessitates stopping operation of the shears, which reduces productivity.

BRIEF SUMMARY OF THE INVENTION

The present invention provides a lubricating system for a metal demolition shears that lubricates one or more of the various wear surfaces. A lubricating system according to the invention may be configured to do so automatically with each cycle of the upper jaw opening and closing. Additionally, where multiple wear surfaces are lubricated, a lubricating system according to the invention may be configured such that the various wear surfaces are lubricated in sequential order. A lubricating system according to the invention thus keeps the various wear parts properly lubricated, thereby extending their service life, while eliminating the need for the operator to stop operations in order to lubricate the wear parts.

In accordance with a first aspect of the invention, the invention features a metal demolition shears having a lower jaw and an upper jaw pivotally connected to the lower jaw. The lower and upper jaws include one or more wear parts with wear surfaces that make sliding or shearing contact with each other as the upper jaw pivots relative to the lower jaw during operation of the shears. The shears further includes a lubricating system that is configured and disposed so as to supply lubricant (for example, grease, cutting oils, etc.) to at least one of the wear parts. The lubricating system includes a lubricant pump, a lubricant supply, and a lubricant output conduit extending from the lubricant pump. The lubricant pump receives lubricant from the supply and pumps lubricant through the lubricant output conduit, toward the at least one wear part.

The shears may include a lubricant distributor valve that receives lubricant from the lubricant output conduit and distributes it to two or more of the wear parts, e.g., in sequential fashion. Generally, the shears will be driven to operate by a hydraulic cylinder, and the hydraulic control system that controls operation of the jaws may also control operation of the lubricant pump.

A lubricating system according to the invention may be used to apply grease or other lubricant to one or more lateral blade stabilizers, a cutting blade insert member, and/or a guide blade disposed opposite to the cutting blade insert member.

In another aspect, the invention provides a blade stabilizer for use in a heavy-duty metal demolition shears. The blade stabilizer includes a generally cylindrical, externally threaded body; a blade-abutment portion at one end of the body; a polygonal bolt end at a second end of the body; and a lubricant conduit extending through the body and terminating, at one end thereof, at the first end of the body.

The lubricant conduit may also terminate, at a second end thereof, at the second end of the body. In particular, the bolt end may have a compression fitting-protecting pocket or cavity formed therein, with the conduit terminating, at its second end, into the compression fitting-protecting socket. The blade abutment portion may have a lubricant dispersion groove extending along a blade-abutment surface thereof, with the lubricant conduit terminating into the lubricant dispersion groove.

In another aspect, the invention provides a wear part for use in a heavy-duty metal demolition shears having a seating surface against which the wear part is configured to be seated. The wear part includes a prismatic body having a pair of parallel, polygonal, major surfaces on opposite sides. At least one bolt hole by means of which the wear part can be secured in an operative position to the heavy-duty metal demolition shears extends through the wear part, and at least one lubricant conduit also extends through the wear part, terminating at at least one of the major surfaces.

The wear part may include a lubricant dispersion groove formed along one or both of the major surfaces, with the lubricant conduit terminating into the lubricant dispersion groove or grooves. The wear part may be configured such that it can be flipped about a longitudinally oriented axis and reseated against the seating surface of the shears, whereby both major surfaces and both lubricant dispersion grooves can be presented during operation of the shears by flipping and reseating the wear part. Additionally or alternatively, the wear part can be configured such that it can be rotated by 180° about a transverse axis and reseated against the seating surface of the shears.

Such a wear part may be a cutting blade insert member, e.g., a rectangular cutting blade insert member. Alternatively, the wear part may be a guide blade, e.g., a hexagonal guide blade.

A lubricating system, blade stabilizer, and wear parts according to the invention allow the various wear surfaces of the wear parts to be lubricated automatically, thus extending service life of the wear parts and increasing productivity by allowing the parts to be lubricated without the operator needing to stop operation each time it is desired to do so.

BRIEF DESCRIPTION OF THE DRAWINGS

These and other features of the invention will be described in greater detail below in connection with the FIGURES, in which.

DETAILED DESCRIPTION OF THE INVENTION

Figure 1:
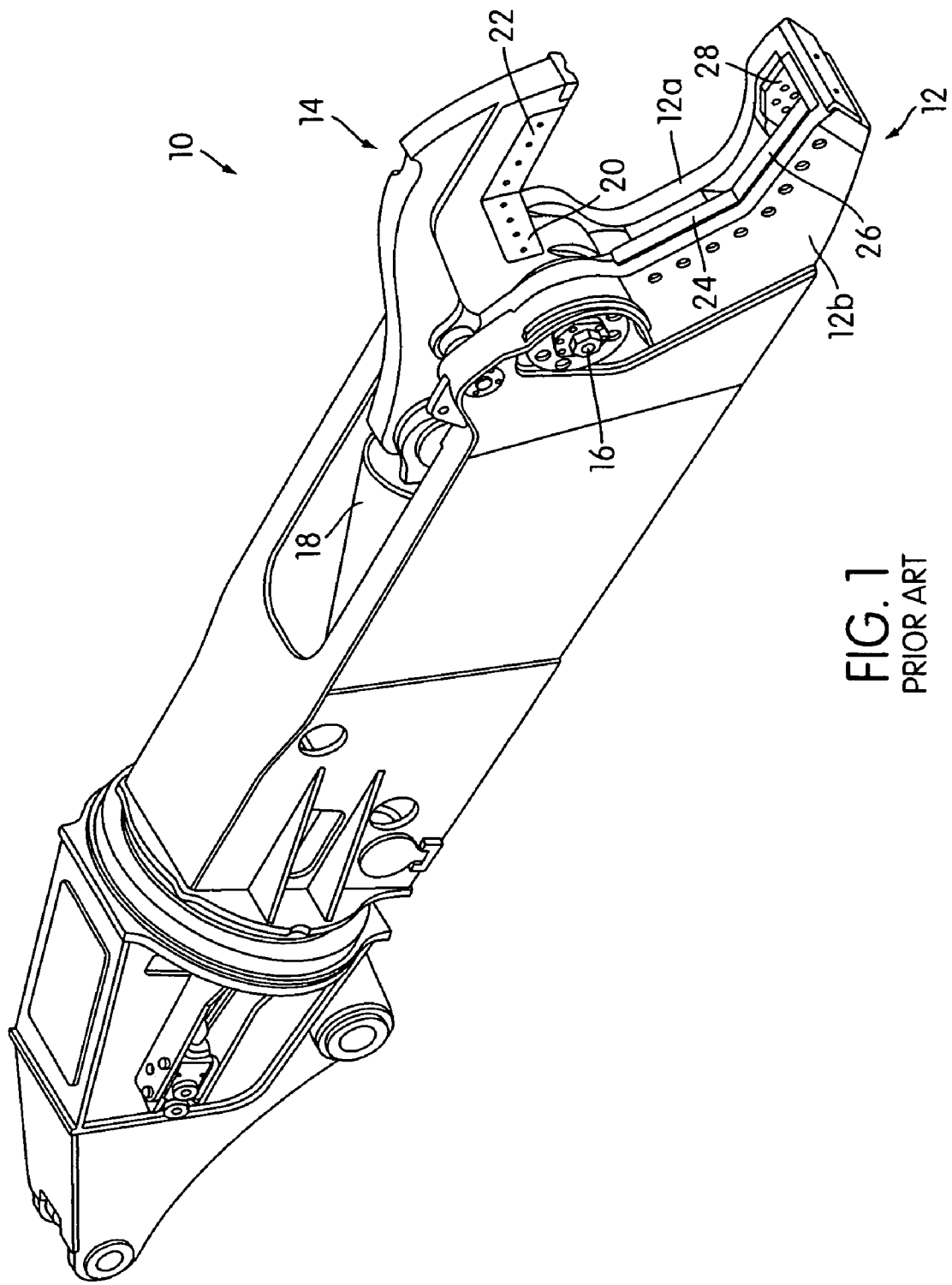
FIGS. 1 and 2 are perspective views from the right and left side, respectively, of a heavy-duty metal demolition shears according to the invention.
Figure 2:
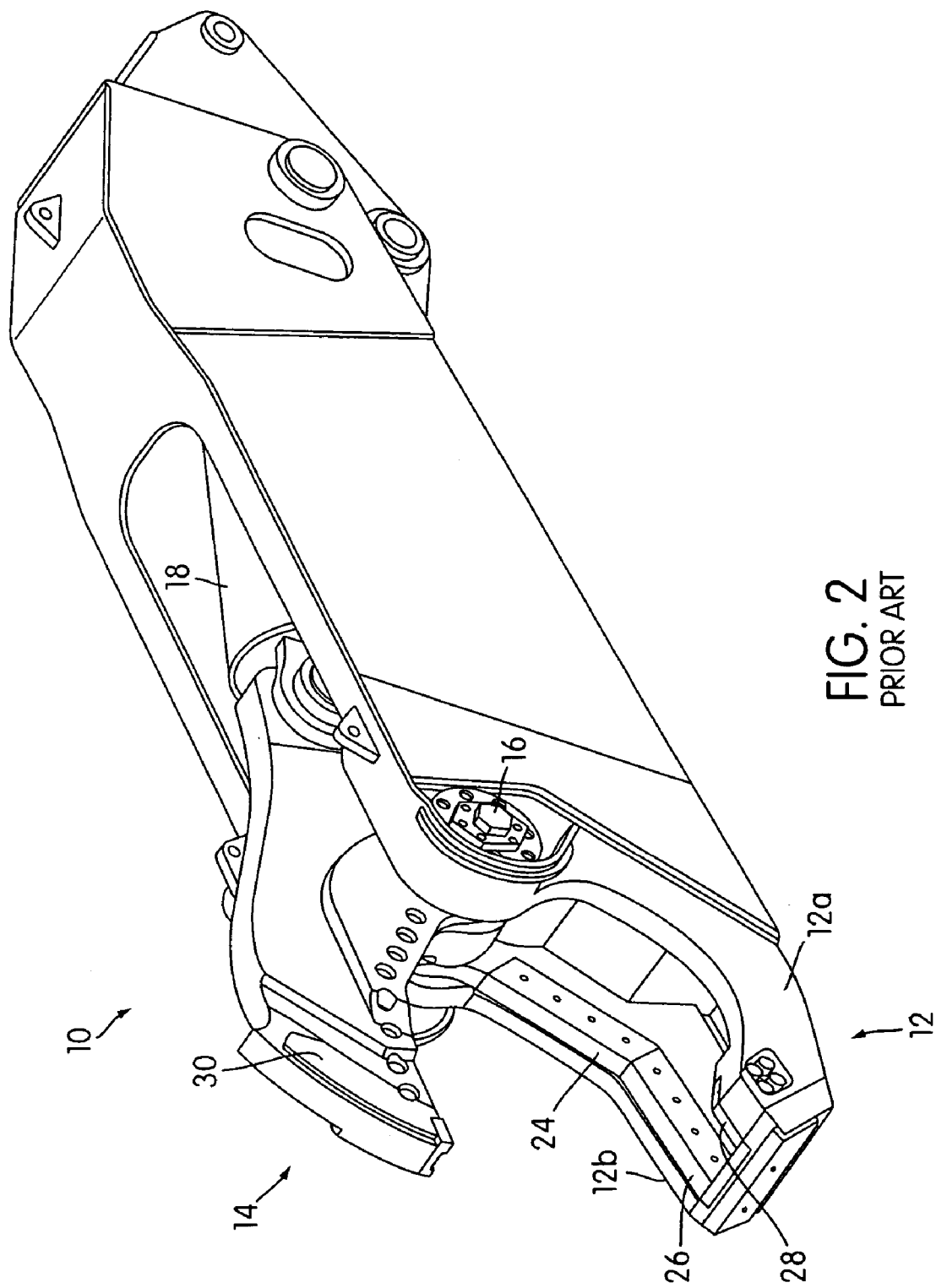
Figure 3:
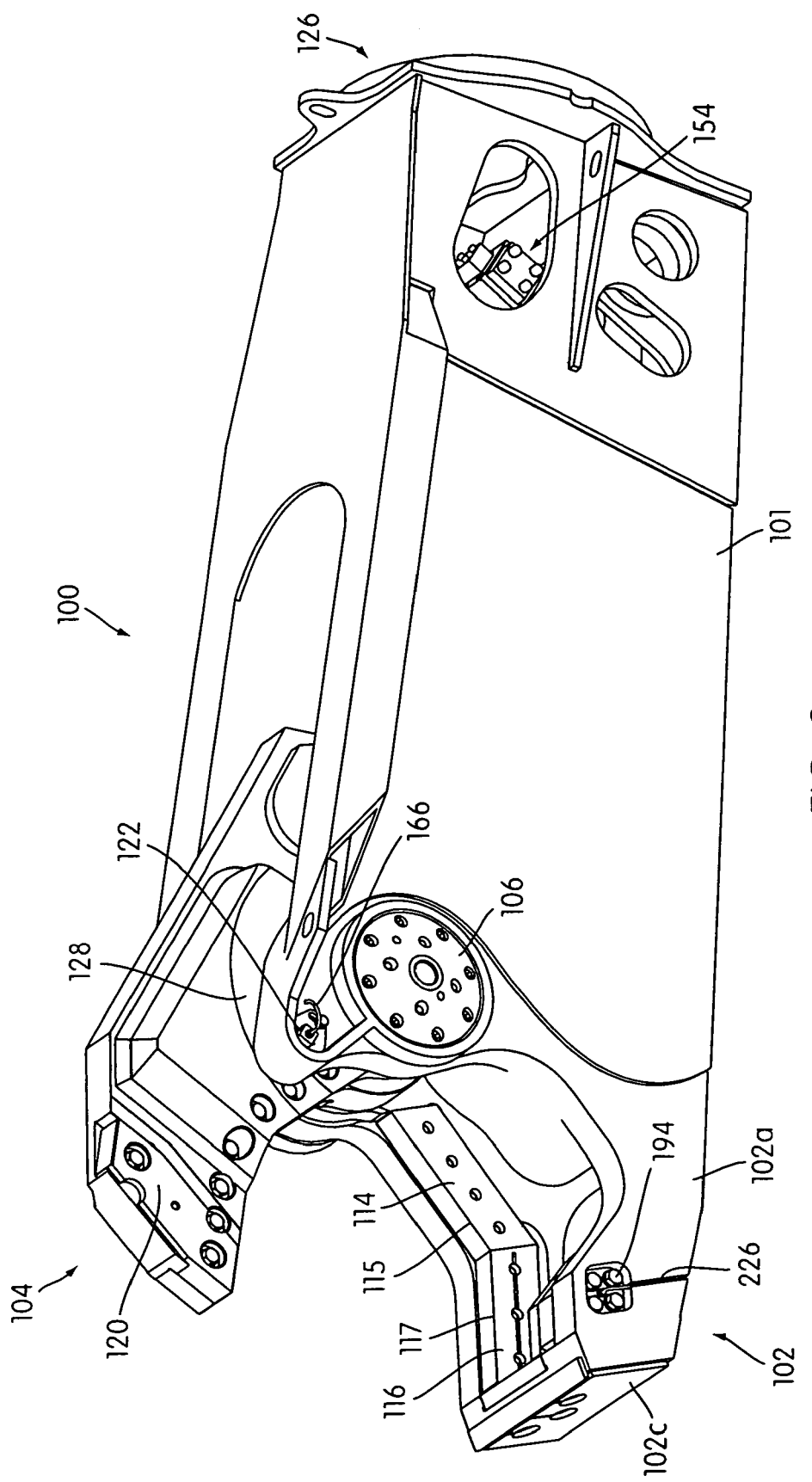
FIGS. 3-6 are perspective views illustrating a heavy-duty metal demolition shears incorporating a lubricating system according to the invention, with FIGS. 3 and 4 showing the shears open and FIGS. 5 and 6 showing the shears closed.

A metal demolition shears 100 that incorporates an embodiment of a lubricating system according to the invention is illustrated generally in FIGS. 3-6. The shears 100 has lower jaws 102 and upper jaws 104 that is pivotally connected to the lower jaws 102 by means of pivot structure 106. The lower jaw 102 includes left-hand lower jaw plate 102*a*, right-hand lower jaw plate 102*b*, and cross-member 102*c* interconnecting the two. The upper jaw 104 is driven to pivot open and closed relative to the lower jaw 102 by means of a hydraulic cylinder 108 (illustrated schematically in FIG. 10).

Upper primary and secondary blade insert members 110, 112, respectively, are secured to a blade seat portion of the upper jaw 104 and provide primary and secondary upper cutting edges 111, 113, respectively. Similarly, lower primary and secondary blade insert members 114, 116, respectively, are secured to seating surfaces formed along the right-hand lower jaw side plate 102*b* and provide primary and secondary lower cutting edges 115, 117, respectively.

A wear guide or guide blade 118 is attached to an inner, slot-facing seat formed along left-hand side plate 102*a* opposing the lower primary and secondary blade insert members, and a wear plate 120 is attached to a lateral surface at a front, nose portion of the upper jaw 104. The wear plate 120 may be configured as described in greater detail in co-pending U.S. application Ser. No. 10/697,554, entitled "METAL DEMOLITION SHEARS WITH INDEXABLE, INTEGRATED WEAR PLATE/PIERCING TIP" and filed on Oct. 31, 2003, the contents of which are incorporated by reference.

The shears 100 also includes a left-hand lateral blade stabilizer 122 and a right-hand lateral blade stabilizer 124. For the illustrated configuration, where primary shearing action occurs between the upper jaw 104 and the right-hand lower jaw plate 102*b*, the left-hand lateral blade stabilizer 122 is located above and forward of the pivot structure 106 (forward being taken to mean in a generally longitudinal direction, from the rear mounting adaptor portion of the shears 126 toward the jaws 102 and 104), and the right-hand lateral blade stabilizer 124 is located generally above and slightly behind the central axis of the pivot structure 106. As the upper jaw 104 pivots open and closed, depending on lateral forces on the upper jaw 104, the left-hand lateral blade stabilizer 122 will make sliding contact along an arcuate portion 128 on the left side of the upper jaw 104, and the right-hand lateral blade stabilizer 124 will make sliding contact along the surface of arcuate wear member 130, which may be formed as a distinct stand-off extending laterally from the surface of the upper jaw.

Figure 4:
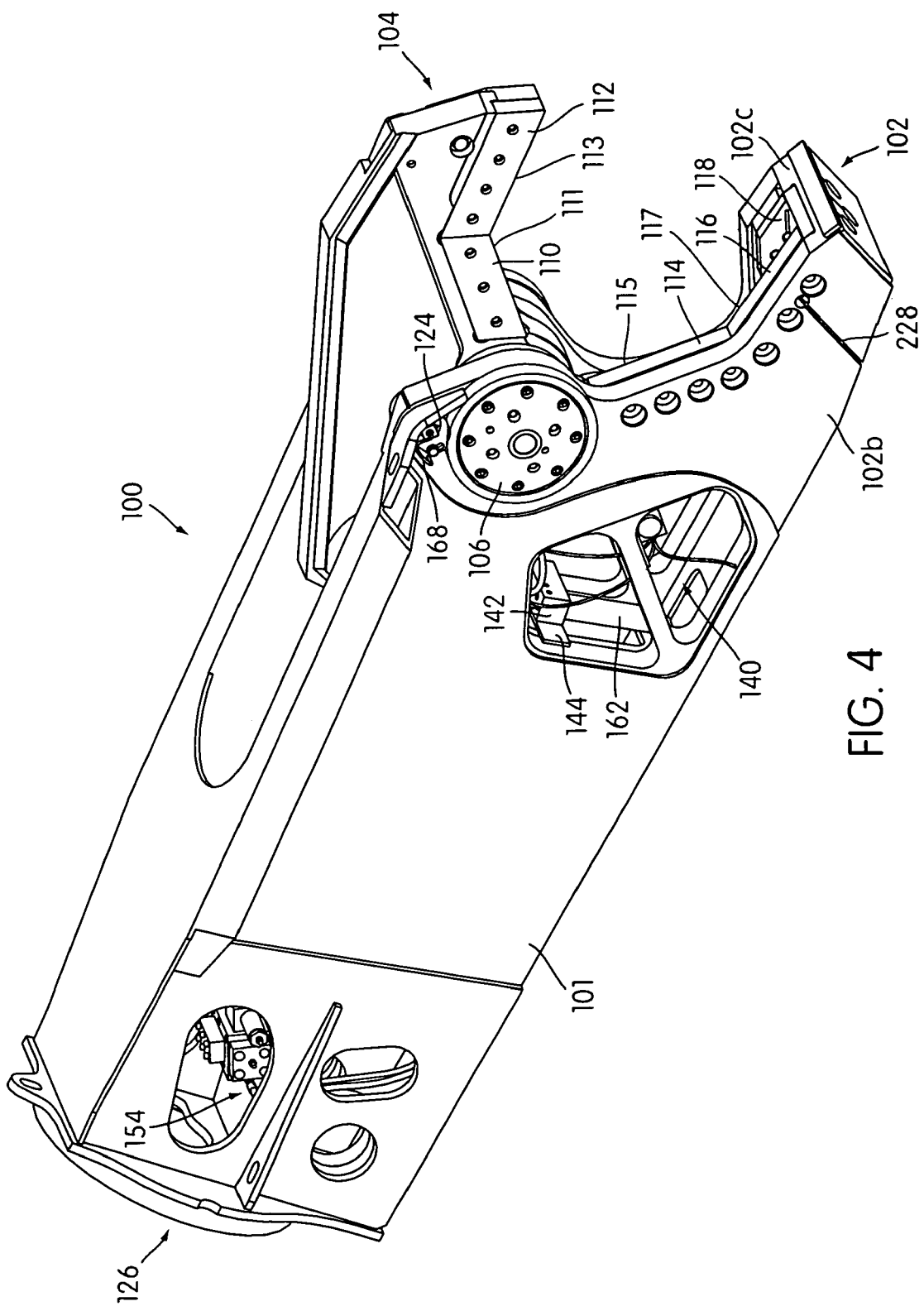
Figure 5:
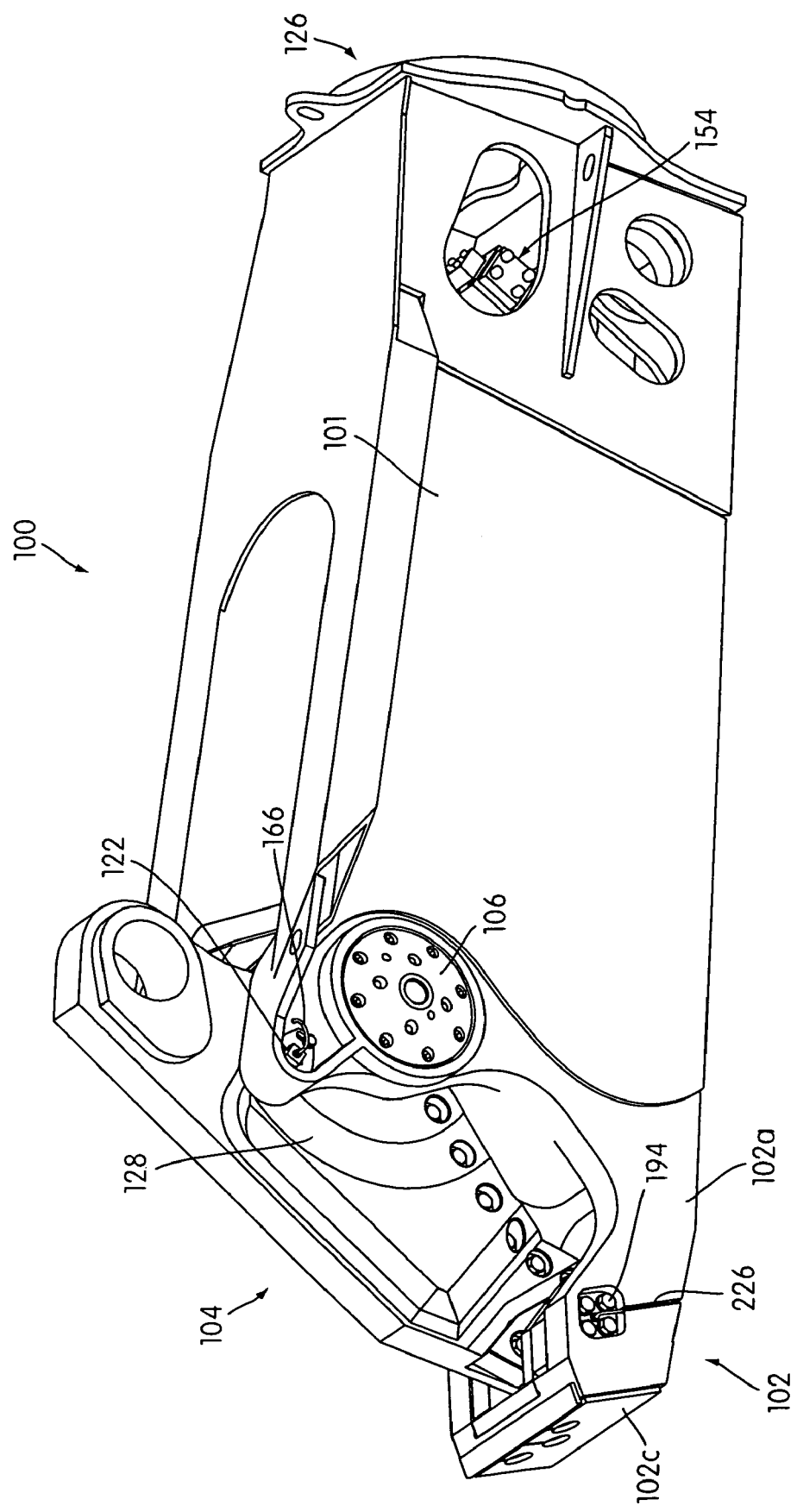
Figure 6:
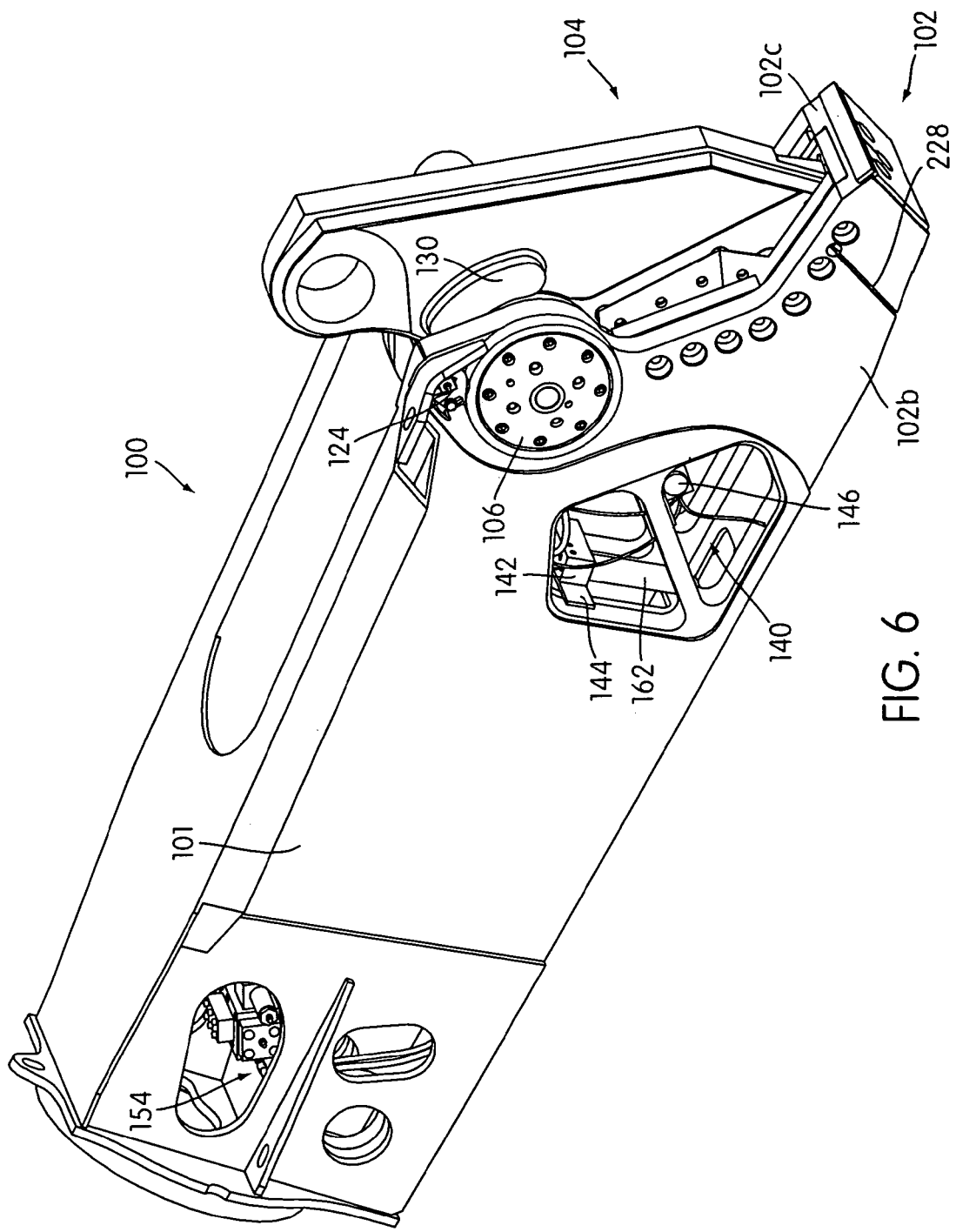

As is visible in FIGS. 4 and 6, and as illustrated in greater detail in FIGS. 7-10, a lubricating system 140 according to the invention is provided and supplies grease or other lubricant to one or more of the various wear parts. In the illustrated embodiment, the lubricating system provides lubricant to the guide blade 118, lower secondary cutting blade insert member 116, and left-hand and right-hand lateral blade stabilizers 122 and 124, but it is not necessary to supply lubricant to all such wear parts for a lubricating system to fall within the scope of the invention, or additional/other wear parts may also be provided with lubricant by means of a lubricating system as per the invention. (For example, the lower primary cutting blade insert member 114 could also be provided with lubricant according to the invention, so long as the more limited blade bypass associated with the primary cutting blades (as compared to the secondary cutting blades) is taken into consideration in positioning the lubricant dispersion grooves (described in detail below) along the faces of the blade insert members.)

The lubricating system 140 includes a hydraulic lubricant pump 142 (e.g., a grease pump) that is supported within the generally box-form body of the shears "stick" structure 101, e.g., by means of a mounting bracket 144 used to secure the hydraulic lubricant pump 142 to an appropriate mounting point. Additionally, the lubricating system 140 may include an SSV valve (sequential lubricant distributor) 146 that distributes grease or other lubricant to each of the various wear parts in sequential fashion. The SSV valve 146 is also mounted, e.g., by means of a mounting bracket 148, to an appropriate mounting point within the shears stick structure 101. The hydraulic lubricant pump 142 may, for example, be a model HTL429 Hydraulic Tool Lubricator, available from Stanley Hydraulic Tools or Lincoln Industrial Corporation, that is customarily used to lubricate the bushings of the tool bit in hydraulic hammers. Alternatively, it can be any other hydraulically actuated grease or lubricant pump. The SSV valve 146 may be a Divider Valve available from Lincoln Industrial.

Figure 9:
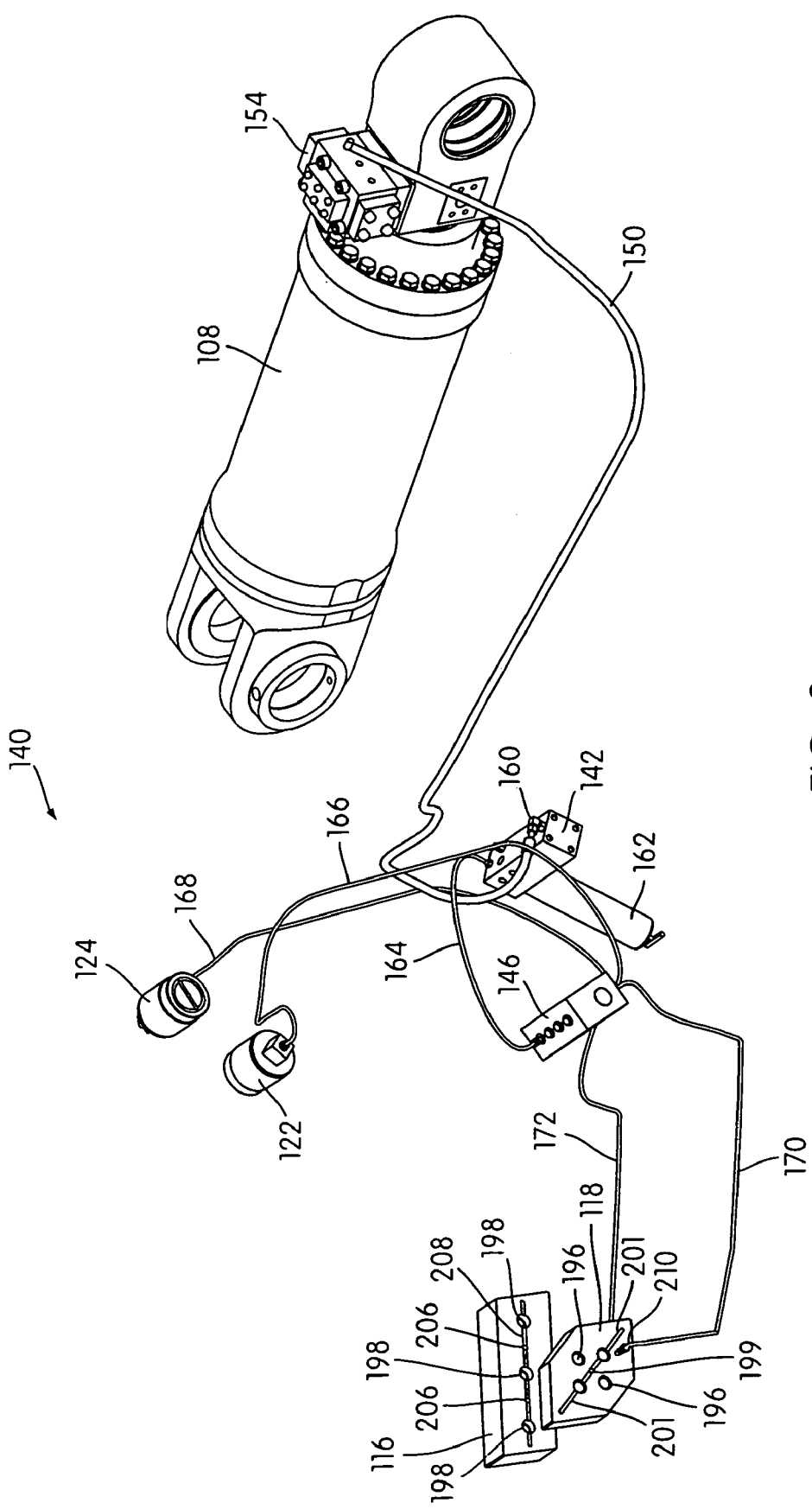
FIG. 9 is a perspective view illustrating just a lubricating system for use in a heavy-duty metal demolition shears as per the invention, along with various possible wear parts to which the lubricating system may be used to apply lubricant.
Figure 10:
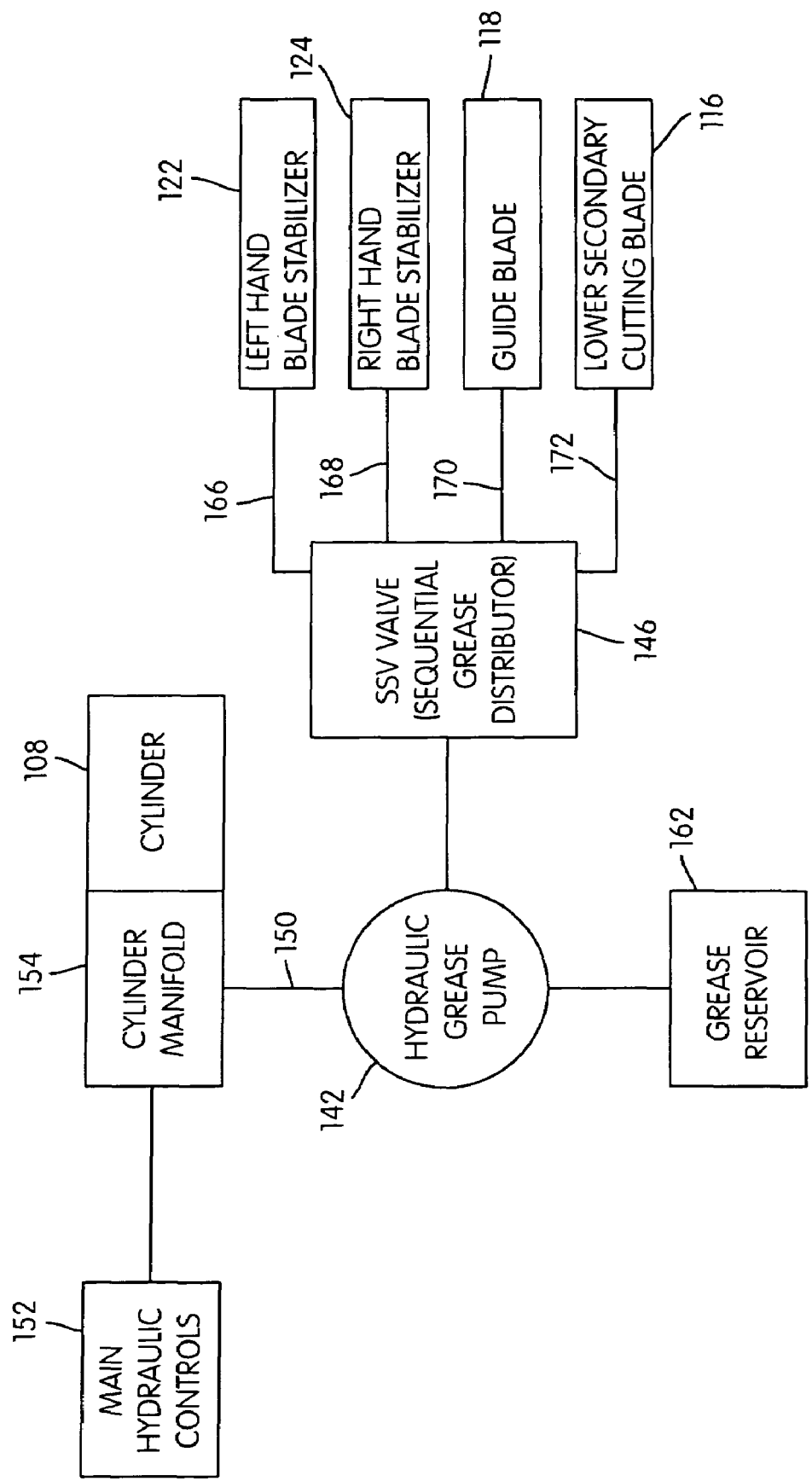
FIG. 10 is a schematic representation of the lubricating system and wear parts as illustrated in FIG. 9.

As illustrated in FIGS. 9 and 10, operation of the hydraulic lubricant pump 142 is controlled by a hydraulic control line 150. The hydraulic control line receives hydraulic fluid from hydraulic cylinder manifold 154, operation of which is regulated by main hydraulic controls unit 152. The hydraulic control line 150 is connected to the hydraulic lubricant pump 142, e.g., at hydraulic coupling 160.

A supply of lubricant is provided to the hydraulic lubricant pump 142 by means of a reservoir 162, e.g., a grease cartridge. The hydraulic lubricant pump 142 is configured such that each time the hydraulic control line 150 is pressurized, the hydraulic pump pumps a metered amount of lubricant, supplied by the reservoir 162, out along primary lubricant output line 164.

If only a single wear part is to be lubricated, the primary lubricant output line 164 may lead directly to a lubricant injection point configured to lubricate that wear part. Where multiple wear parts are to be lubricated, however, the primary lubricant output line 164 feeds lubricant to the SSV valve (sequential grease distributor) 146. The SSV valve 146 then feeds lubricant sequentially, with each cycle of operation of the pump 142, to the various individual lubricant output lines 166, 168, 170, and 172. As illustrated in FIGS. 9 and 10, the individual lubricant output lines 166, 168, 170, and 172 supply lubricant to the left-hand lateral blade stabilizer, the right-hand lateral blade stabilizer, the lower secondary cutting blade insert member 116, and the guide blade 118, respectively.

Further details of the various wear parts configured for use in a heavy-duty metal demolition shears that may be lubricated by means of a lubricating system according to the invention are illustrated in FIGS. 11-19.

Figure 11:
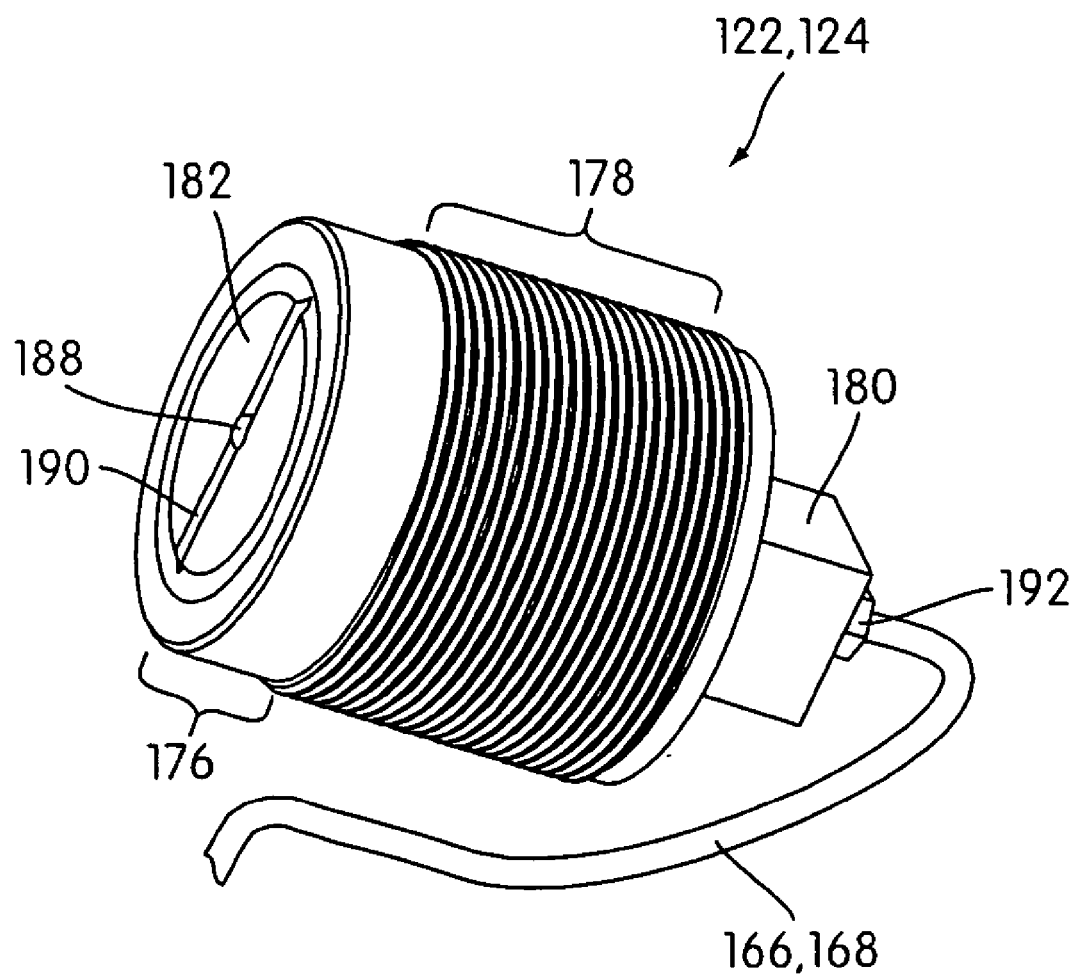
FIG. 11 is a perspective view illustrating a lateral blade stabilizer configured for use with a lubricating system according to the invention.
Figure 12:
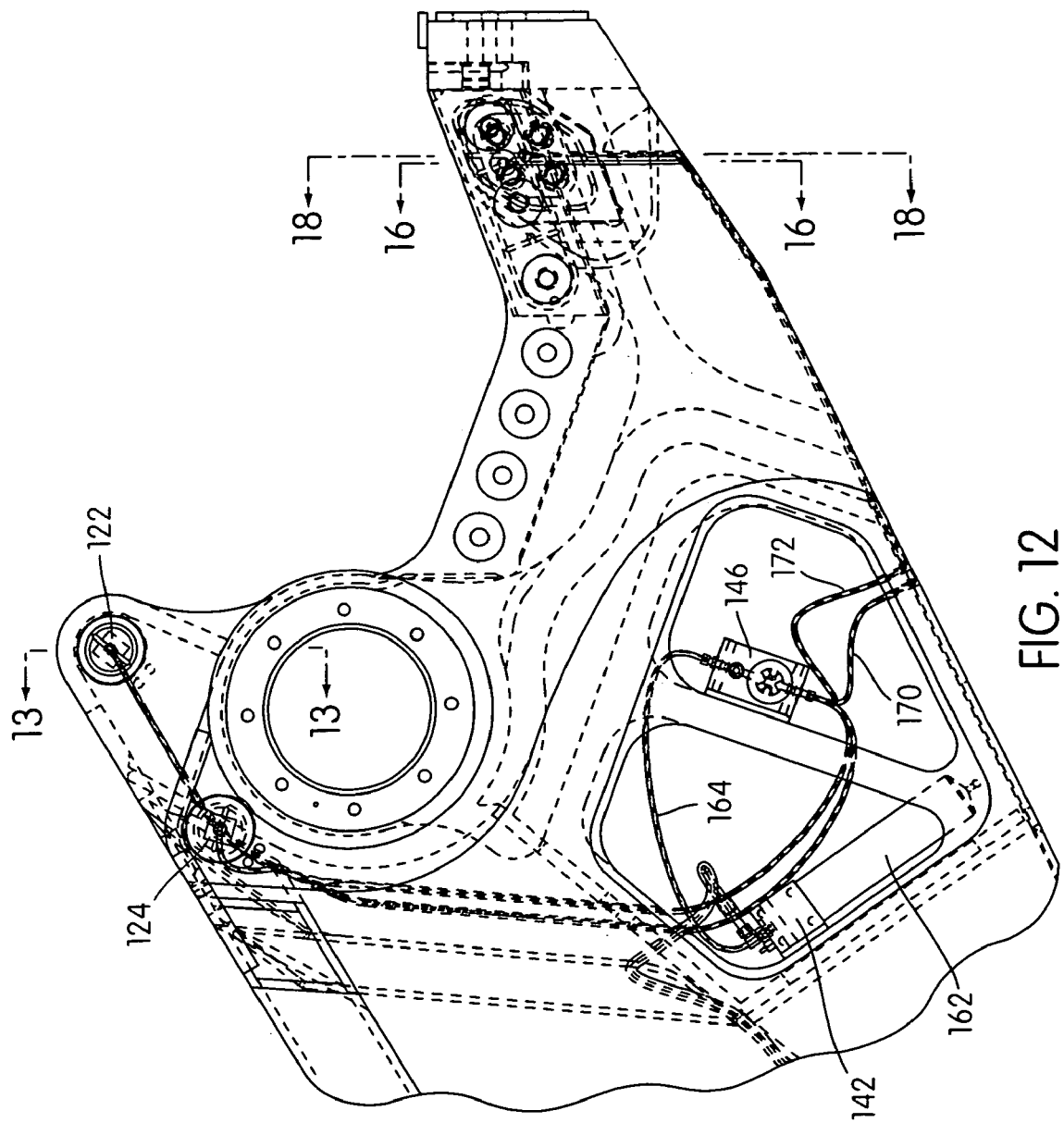
FIG. 12 is a partial plan view of the lower jaw assembly of a heavy-duty metal demolition shears incorporating a lubricating system according to the invention.
Figure 13:
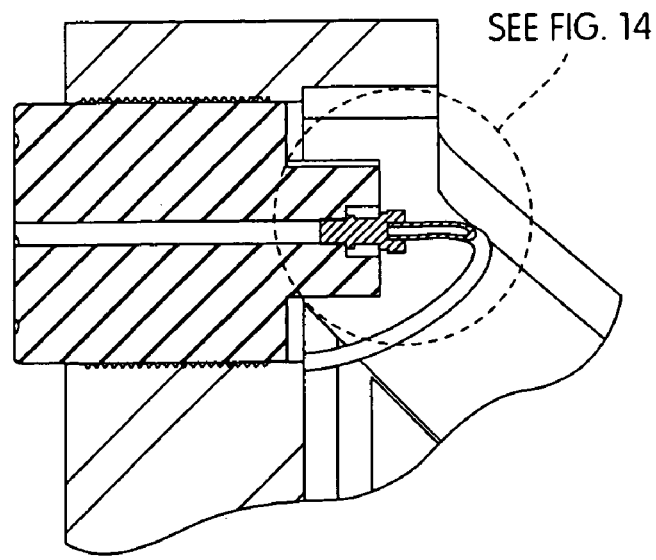
FIG. 13 is a section view taken along lines 13-13 in FIG. 12.
Figure 14:
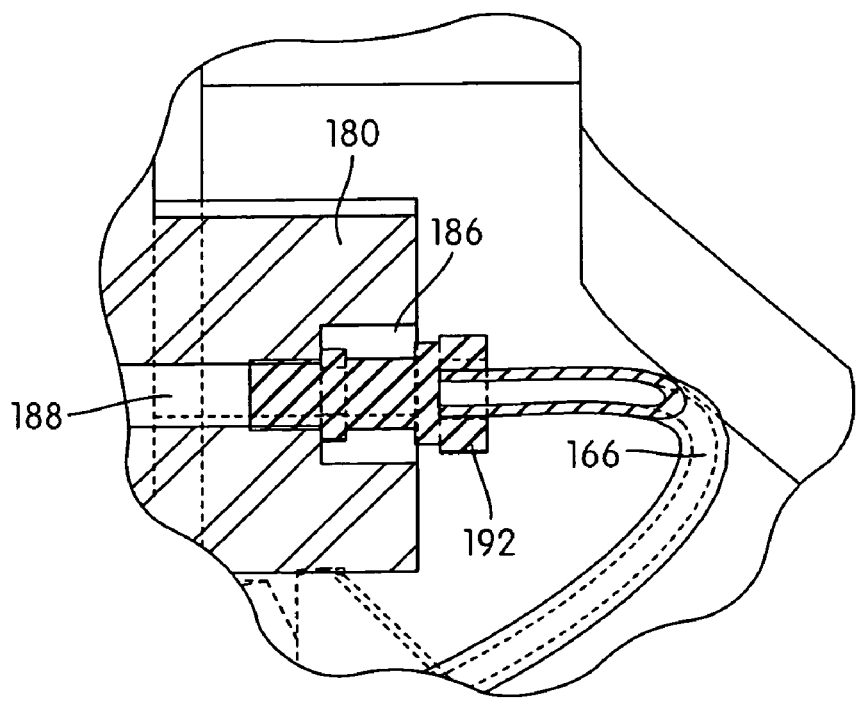
FIG. 14 is a close-up view of the circled portion thereof, illustrating a lateral blade stabilizer according to the invention.

Details as to the construction and mounting of the left-hand lateral blade stabilizer 122, the right-hand lateral blade stabilizer 124, and attachment of the individual lubricant output lines 166, 168 to them are illustrated in FIGS. 11-14. As illustrated in FIG. 11, the left-hand and right-hand lateral blade stabilizers are each manufactured as solid, generally cylindrical members. The stabilizers include an end-most blade abutment portion 176, an externally threaded shank portion 178, and a polygonal (e.g., square) bolt end 180. The blade abutment portion 176 may terminate in a slight frustroconical beveled lubricant dispersion stand-off 182 that is on the order of 0.18 inch in height. As illustrated in FIGS. 13 and 14, the bolt end 180 has a central cavity or pocket 186 which protects the lubricant fittings 192, and a central, axially extending lubricant conduit 188 extends from the bottom of the socket 186 all the way through the blade stabilizer to the blade abutment portion 176, as shown in FIG. 11. The lubricant dispersion stand-off 182 has a diametrically extending lubricant dispersion groove 190 extending across it, and the central, axially extending lubricant conduit 188 communicates lubricant into it. The lateral blade stabilizers 122, 124 may be machined from steel, aluminum, bronze, or brass.

The left-hand and right-hand lateral blade stabilizers 122, 124 are screwed into internally threaded bores extending through the left-hand lower jaw plate 102a and the right-hand lower jaw plate 102b, respectively, generally above the pivot structure 106. Their positions are secured by placing a lock plate over each of the bolt ends and securing the lock plates to the side plates 102a and 102b, as is known in the art.

As further illustrated in those figures and in FIG. 12, the individual lubricant output lines 166, 168 are routed generally internally and secured to the internal structure of the stick structure 101 of the shears; they pass externally out through appropriately sized bores formed in the lower jaw side plates 102a and 102b, generally in the vicinity of the lateral blade stabilizers 122 and 124, as illustrated in FIGS. 3-7.

The lubricant output lines 166, 168 interconnect with the lateral blade stabilizers 122 and 124 by means of swiveling NPT (National Pipe Thread) compression fittings 192. The compression fittings 192 are crimped onto the ends of the lubricant output lines 166, 168, and their opposite, male ends are threaded into the axially extending lubricant conduits 188, as illustrated in FIGS. 13 and 14. With this arrangement, lubricant is applied to reduce wear between the arcuate wear portion 128 on the left side of the upper jaw 104 and the left-hand lateral blade stabilizer 122, and between the lateral surface of the arcuate wear member 130 and the right-hand lateral blade stabilizer 124 on the right side of the shears 100 by conveying lubricant through the lubricant conduits 188 and allowing it to be distributed over the surface of lubricant dispersion stand-offs 182 by means of the lubricant dispersion grooves 190.

Further details of the construction and arrangement of the guide blade 118 and the lower secondary cutting blade insert member 116, and the means by which they are lubricated by the lubricating system of the invention, are shown in FIGS. 3-7, 9, and 15-19. As illustrated in those figures, the guide blade 118 and the lower secondary cutting blade insert member 116 are both formed as prisms, with the guide blade being a generally hexagonal prism (i.e., its two major surfaces, which are the primary wear surfaces, are formed as hexagons) and the lower secondary cutting blade insert member being a generally rectangular prism (i.e., its two major surfaces, edges of which form the cutting edges, is formed as a rectangle), as is known generally in the art. (The guide blade could also be generally rectangular, if so desired.) The guide blade 118 and the lower, secondary cutting blade insert member 116 are seated against appropriately configured seating surfaces provided along the slot-facing surfaces of the left-hand lower jaw side plate 102a and the right-hand lower jaw side plate 102b, respectively, as is also generally known in the art.

Figure 15:
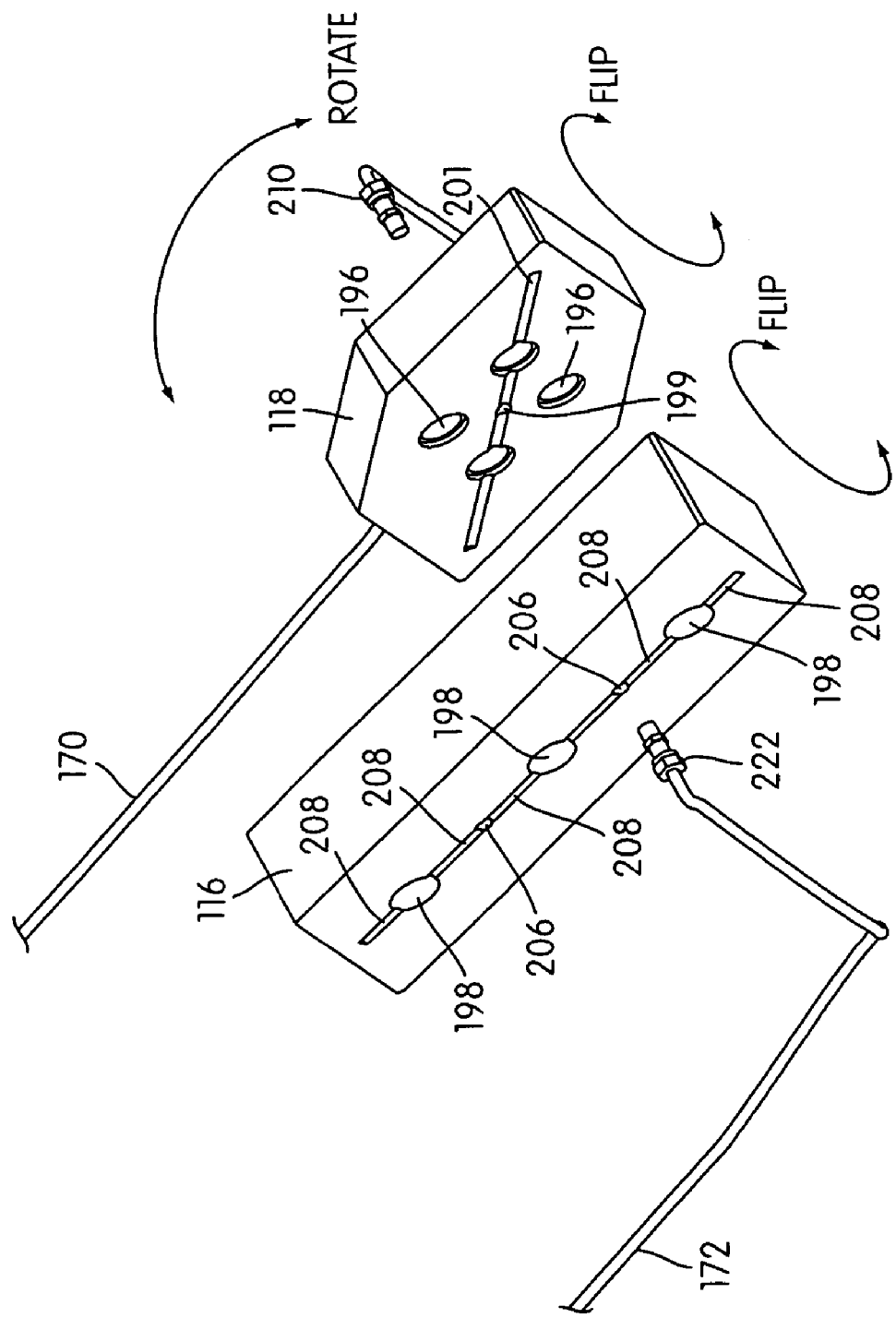
FIG. 15 is a perspective view illustrating a guide blade and a blade insert member configured for use with a lubricating system according to the invention.

The guide blade 118 and the lower secondary cutting blade insert member 116 (as well as the other cutting blade insert members, if desired) may be configured so they each can be flipped about their diagonal and longitudinal axes, respectively, so that both major surfaces of each can be presented, as illustrated in FIG. 15 and as is also generally known in the art. Additionally, the guide blade 118 and lower secondary cutting blade insert member 116 (as well as the other cutting blade insert members, if desired) may be configured so that they each can be rotated 180° about their respective transverse axes and re-seated against their respective seating surfaces, as also illustrated in FIG. 15 and as is also generally known in the art.

The guide blade 118 is secured against its seating surface 202 (FIG. 16) by means of plow bolts 194 (FIGS. 3 and 5) that pass through bolt holes 196 extending through the guide blade 118 and through the left-hand lower jaw side plate 102a, as is known in the art. Similarly, the lower secondary cutting blade insert member 116 is secured against a seating surface or, as shown, against an adjusting plate and shim arrangement 216 by means of plow bolts (not shown) that pass through bolt holes 198 extending through the blade insert member and through bolt holes extending through the right-hand lower jaw side plate 102b and the adjusting plate and shim 216, as is also known in the art.

Figure 16:
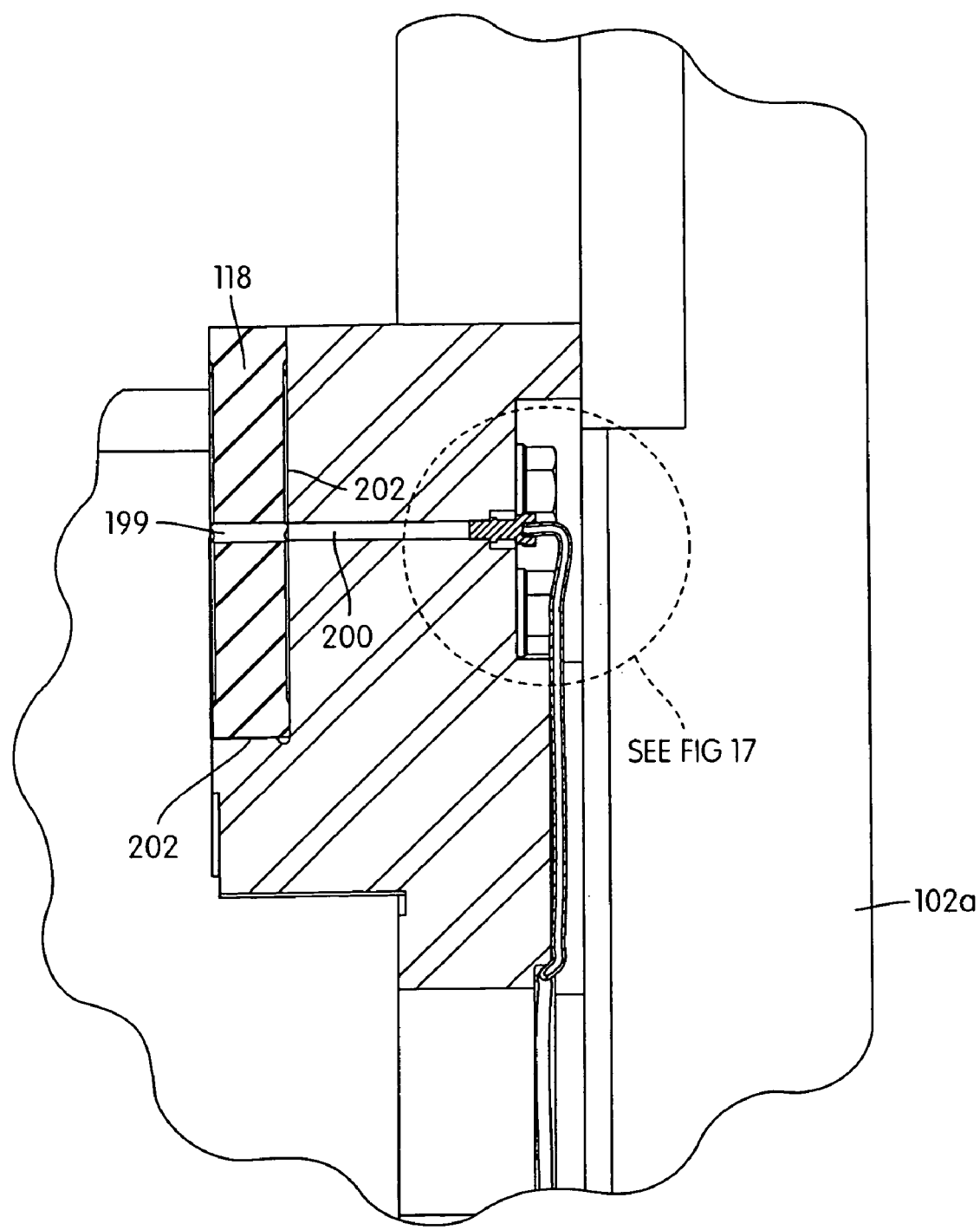
FIG. 16 is a section view taken along lines 16-16 in FIG. 12.
Figure 17:
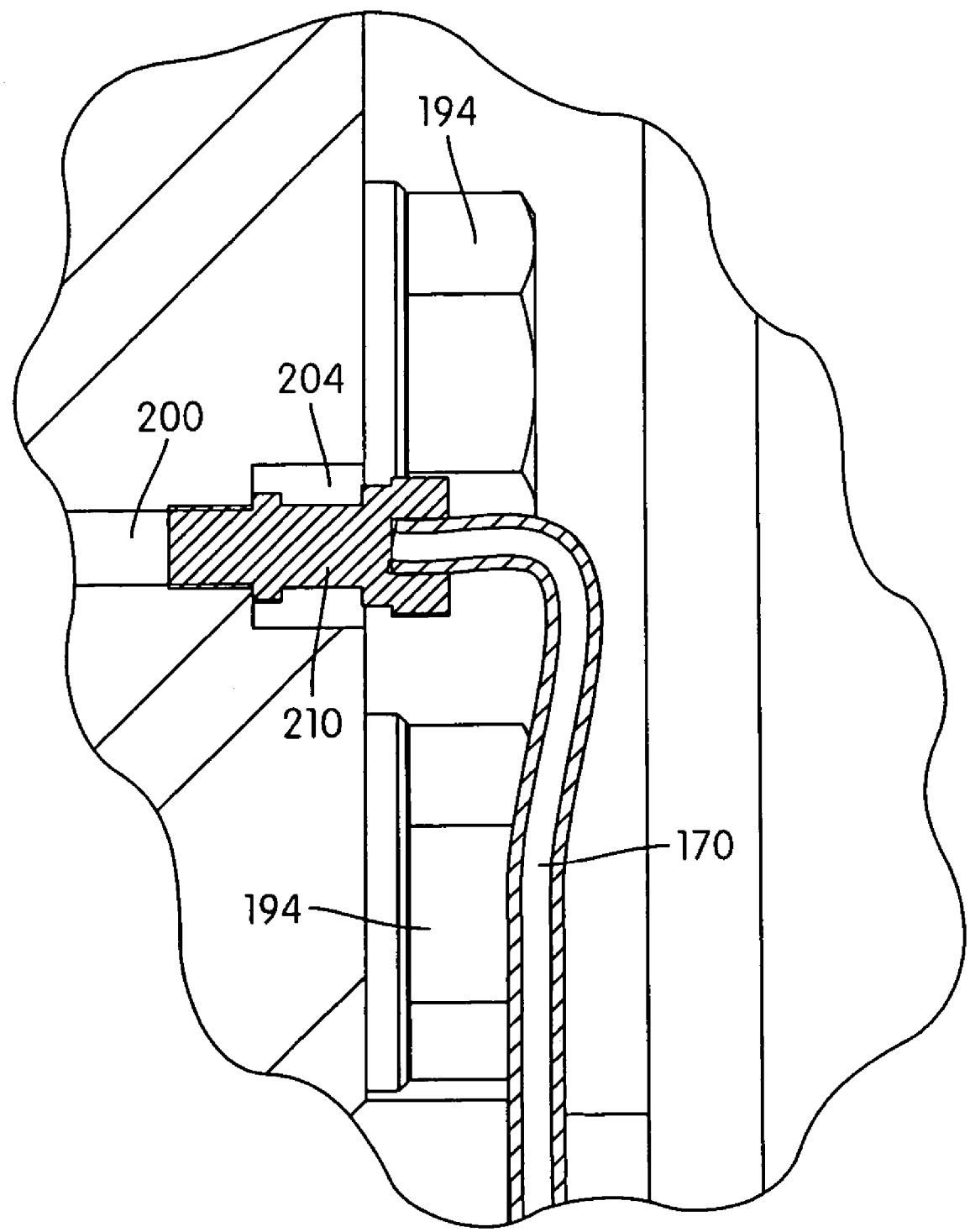
FIG. 17 is a close-up view of the circled portion thereof, illustrating a guide blade according to the invention.

As further illustrated in FIGS. 15-17, the guide blade 118 has a lubricant conduit 199 that extends laterally through the guide blade 118, along the axis of rotation, from one side (major surface) to the other side (major surface). On each side of the guide blade 118, a lubricant dispersion groove 201 is formed into which the lubricant conduit 199 distributes lubricant. The lubricant dispersion grooves 201 extend substantially along the diagonal length of both of the major surfaces of the guide blade 118.

Figure 18:
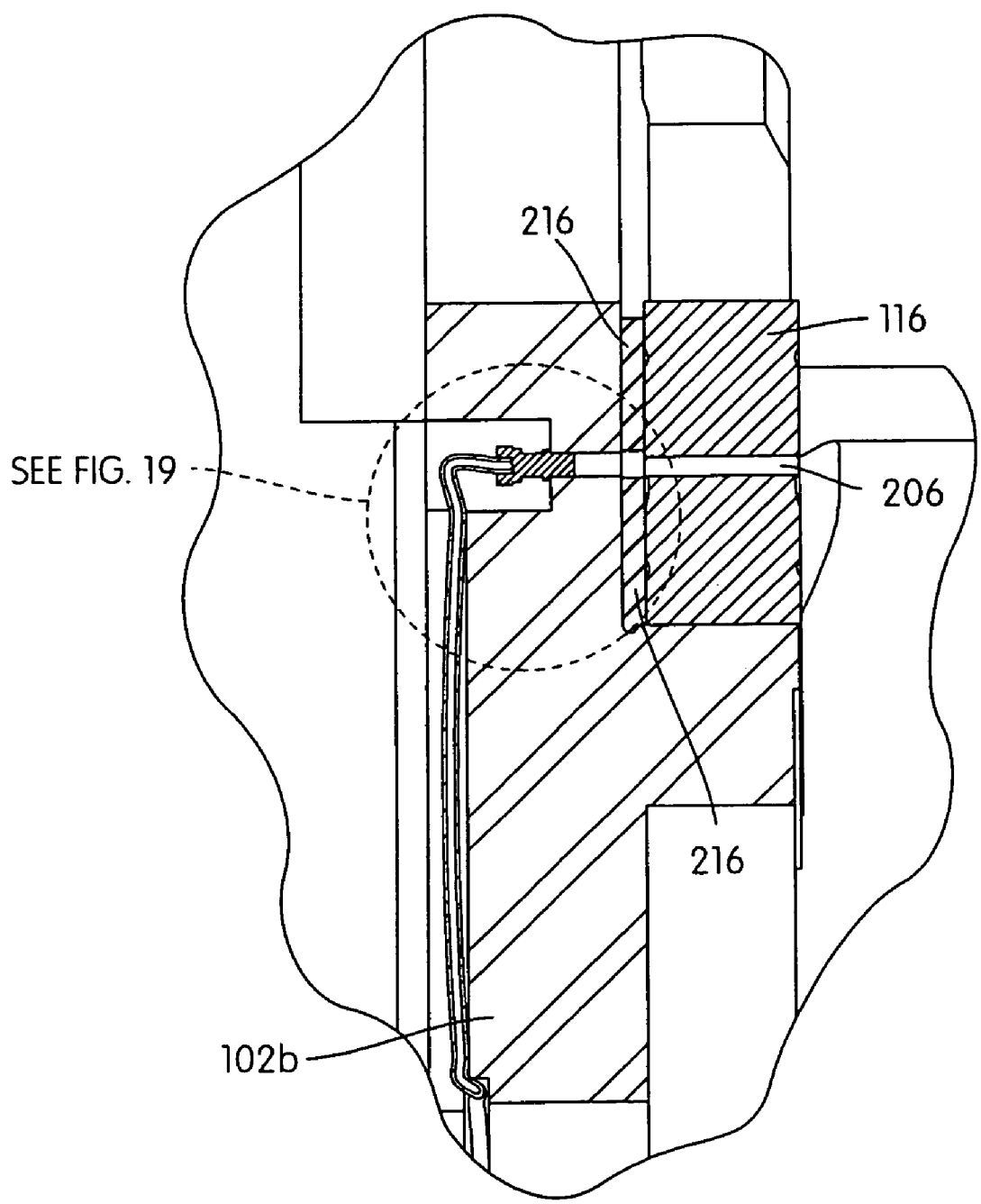
FIG. 18 is a section view taken along lines 18-18 in FIG. 12.
Figure 19:
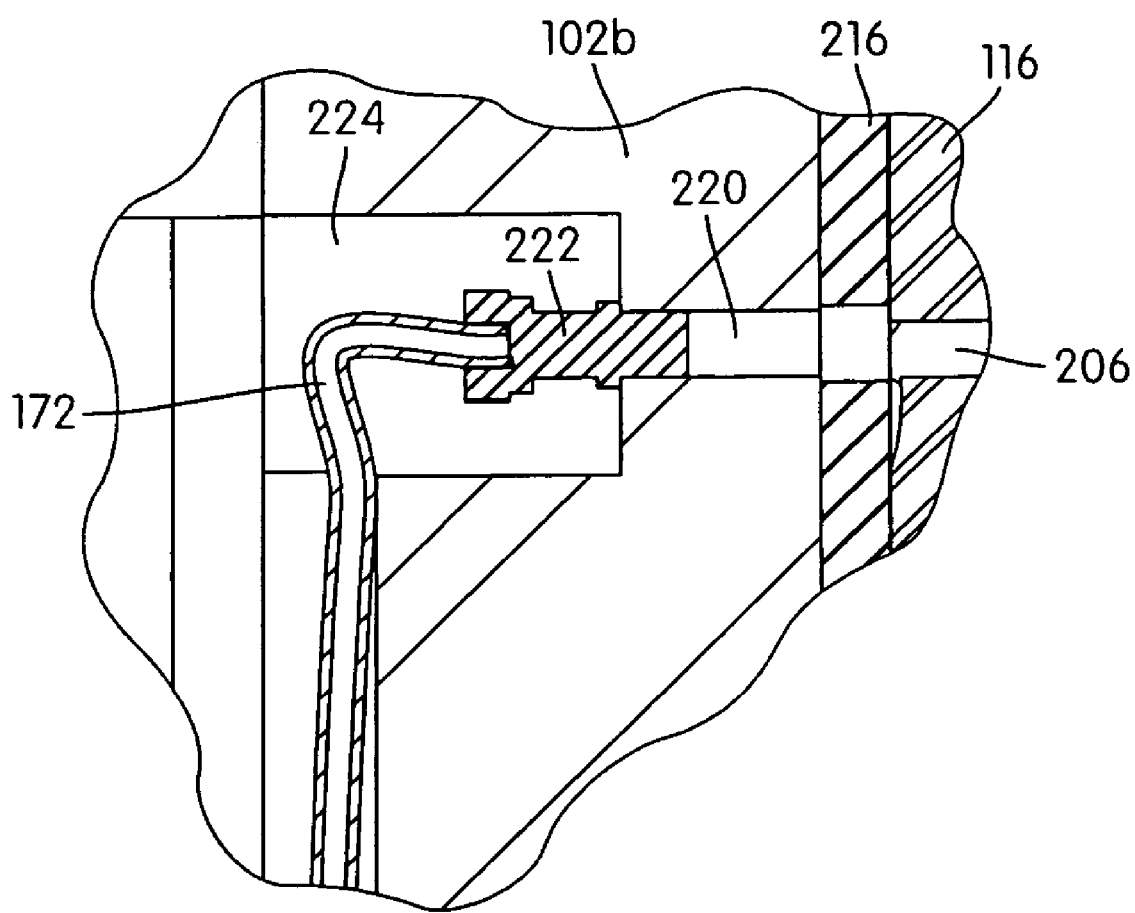
FIG. 19 is a close-up view of the circled portion thereof, illustrating a blade insert member according to the invention.

Similarly, as shown in FIGS. 15, 18, and 19, the lower secondary blade insert member 116 has one or more (in this case two) lubricant conduits 206 that extend laterally through the blade insert member 116, from one side (major surface) to the other side (major surface) of the blade insert member. The number and positioning of the lubricant conduits 206 may vary, depending on the number and arrangement of the bolt holes 198. Additionally, each side (major surface) of the blade insert member 116 has a lubricant dispersion groove 208 that extends longitudinally along the major surface of the blade insert member. As shown in FIG. 15, the lubricant conduit or conduits 206 terminate into the lubricant dispersion grooves 208 on each side of the blade insert member 116.

As illustrated in FIGS. 16 and 17, a lubricant channel 200 extends laterally outwardly from the seating surface 202 against which the guide blade 118 sits and terminates into a counterbore or cavity 204 that protects the fitting 210. As illustrated in FIG. 16, the guide blade 118 is seated against seating surface 202 with the central lubricant conduit 199 that extends through the guide blade 118 aligned with the lubricant channel 200 extending through the lower jaw side plate 102a. Externally, i.e., on the outer-facing side of the left-hand lower jaw side plate 102a, a compression fitting 210 is inserted into the counterbore or cavity 204, with the male end of the compression fitting 210 screws into the end of the lubricant channel 200. The compression fitting 210 is crimped onto the end of the individual lubricant output line 170. Thus, lubricant can be provided to the exposed wear surface of the guide blade 118 by being conveyed along individual lubricant output line 170, through the lubricant channel 200 formed in the lower jaw side plate 102a, through the lubricant conduit 199 extending through the guide blade 118, and then being distributed along the lubricant dispersion groove 201. As the upper jaw pivots open and closed, and the wear plate 120 slides past the guide blade 118, lubricant will be distributed over the exposed surfaces of both the guide blade 118 and the wear plate 120, thus reducing friction and hence wear on those parts.

Similarly, as illustrated in FIGS. 18 and 19, a lubricant channel 220 extends laterally through the lower right-hand jaw side plate 102b. The lower secondary blade insert member 116 is seated against a seating surface or, as shown, an adjusting plate and shim 216, with lubricant conduit 206 extending through the blade insert member 116, aligned with lubricant conduit 220, and extending through the lower jaw side plate 102b and through the adjusting plate and shim 216. A swiveling NPT compression fitting 222 is crimped onto the end of individual lubricant output line 172. The lubricant compression fitting 222 fits within pocket 224, which protects the fitting, and the male end of the compression fitting 222 screws into the end of the lubricant conduit 220.

With this arrangement, lubricant is provided to the exposed major surface of the blade insert member 116 by being provided along lubricant output line 172 and flowing through lubricant channel 220 (in the lower jaw side plate 102b) and lubricant conduit 206 (through the blade insert member), then being distributed along the exposed lubricant dispersion groove 208. As the upper jaws opens and closes and the upper secondary blade insert member moves past the lower secondary blade insert member, lubricant will be spread over the major exposed surfaces of both, thereby reducing frictional wear and extending service life of the parts.

Figure 7:
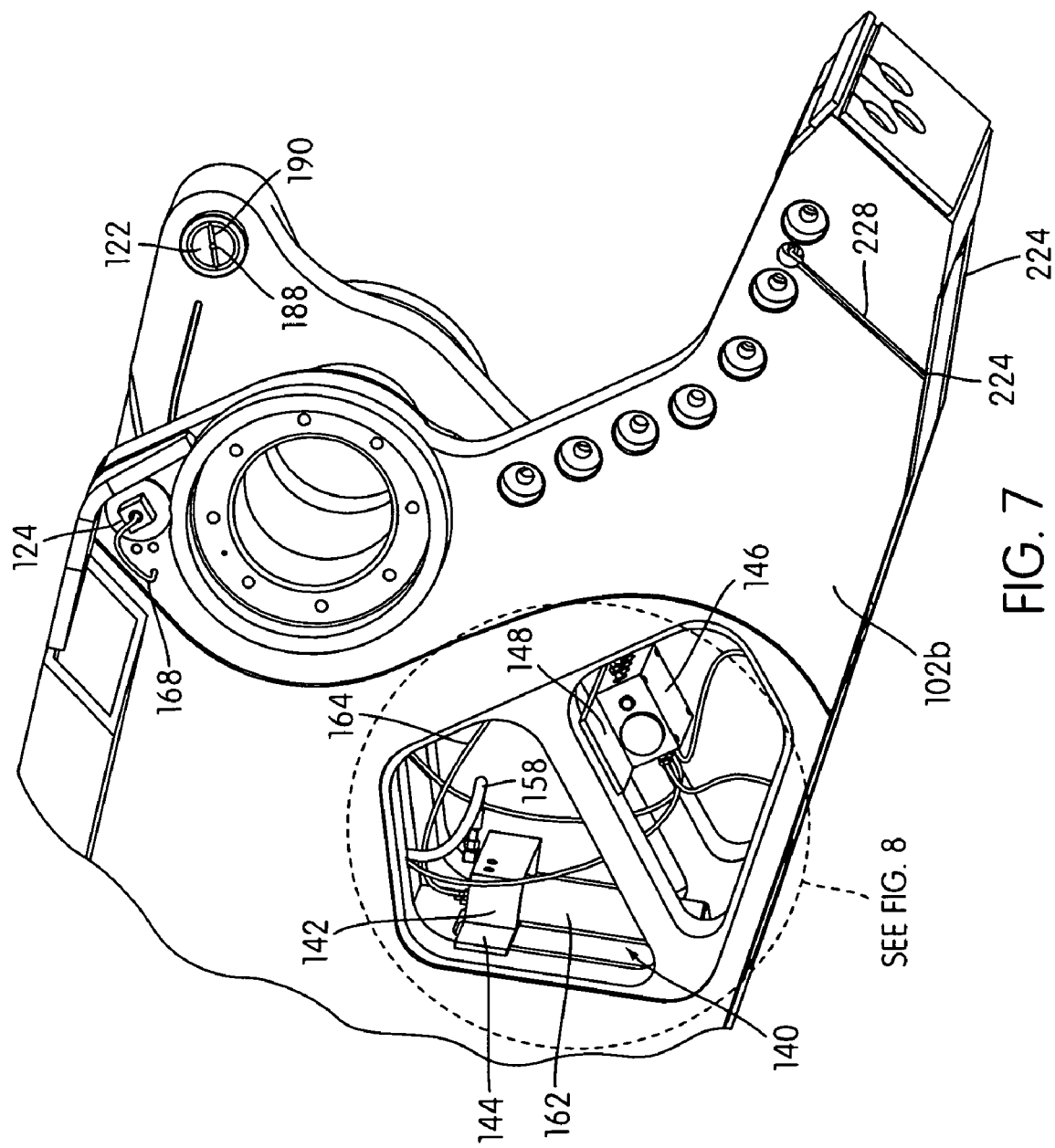
FIG. 7 is a perspective view of the lower jaw assembly of a heavy-duty metal demolition shears, without the upper jaw assembly or pivot group installed, incorporating a lubricating system according to the invention.
Figure 8:
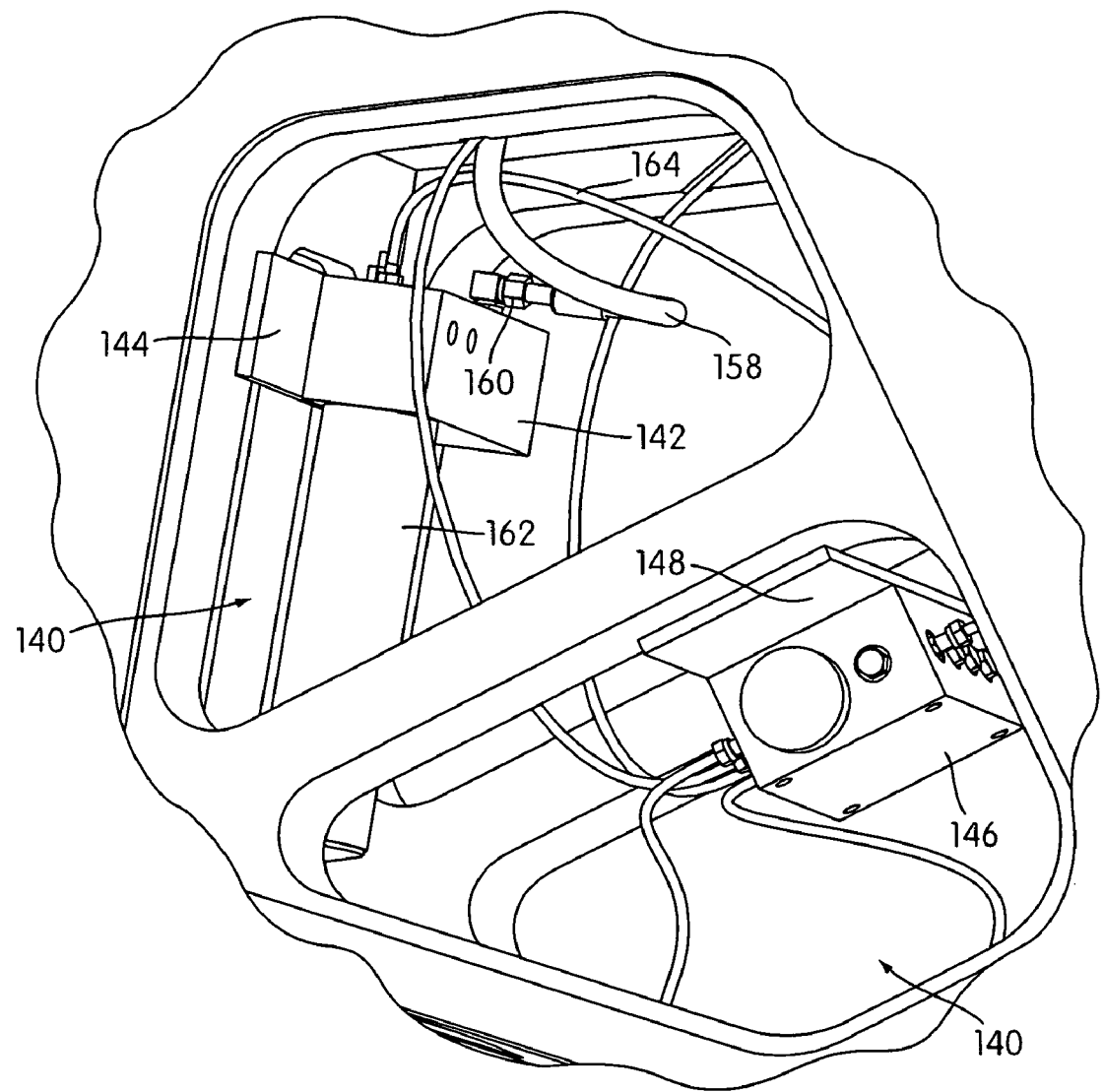
FIG. 8 is a close-up view illustrating components of the lubricating system.

As illustrated, for example, in FIGS. 7 and 12, the lubricant output lines 170 and 172 are routed generally internally through the structure of the jaws. They then exit through lubricant output line exit ports 224 on either side of the jaws and extend along lubricant output line guide channels 226 and 228 formed in the outer surfaces of the left-hand and right-hand lower jaw side-plates 102a and 102b, respectively.

With this arrangement, the various wear parts and wear surfaces can be automatically lubricated while a metal demolition shears is being operated. This extends the service life of the various wear parts and increases productivity by eliminating the need to stop operation every time it is desired to lubricate the various wear parts. Although a specific embodiment of the invention has been disclosed and described for illustrative purposes, various modifications to and departures from the disclosed embodiment will occur to those having skill in the art. For example, a lubricating system according to the invention might also be extended to apply grease or other lubricant to the main pivot structure of the demolition shears, or to some other region of the shears that makes sliding or frictional contact and that is subject to wear. Those and other such departures from the disclosed embodiments are deemed to be within the scope of the following claims.

What is claimed is:

1. A metal demolition shears, comprising:
    a lower jaw and an upper jaw pivotally connected to said lower jaw, said lower and upper jaws including one or more wear parts with wear surfaces that shearingly interact with each other as said upper jaw pivots relative to said lower jaw during operation of said shears; and
    a lubricating system configured and disposed so as to supply lubricant to at least one of said wear parts, said lubricating system comprising a lubricant pump, a lubricant supply, and a lubricant output conduit, said lubricant output conduit being supported by one of the jaws and extending from said lubricant pump, said lubricant pump receiving lubricant from said lubricant supply and pumping lubricant through said lubricant output conduit toward said at least one wear part,
    wherein the at least one of said wear parts comprises a cutting blade insert member, and
    wherein the lubricant output conduit is at least partially defined by the cutting blade insert member.

2. The shears of claim 1, further comprising a lubricant distributor valve, said lubricant distributor valve receiving lubricant from said lubricant pump and distributing lubricant to two or more of said wear parts.

3. The shears of claim 2, wherein said lubricant distributor valve distributes lubricant to said two or more wear parts in sequential fashion.

4. The shears of claim 1, further comprising a hydraulic cylinder that drives said upper jaw to pivot relative to said lower jaw and a hydraulic control system that controls operation of said hydraulic cylinder, wherein said hydraulic control system also controls operation of said lubricant pump.

5. The shears of claim 4, further comprising a lubricant distributor valve, said lubricant distributor valve receiving lubricant from said lubricant pump and distributing lubricant to two or more of said wear parts.

6. The shears of claim 5, wherein said lubricant distributor valve distributes lubricant sequentially to said two or more wear parts, said lubricant distributor valve distributing lubricant to one of said wear parts each time said lubricant pump is caused to operate.

7. The shears of claim 1, wherein
said lower jaw includes at least one cutting blade insert member and a guide blade disposed opposite to said cutting blade insert member;
said shears further includes at least one lateral blade stabilizer configured and disposed to absorb lateral loads when said upper jaw is deflected laterally relative to said lower jaw; and
said lubricating system is configured and disposed to supply lubricant to said at least one cutting blade insert member, to said guide blade, and to said at least lateral blade stabilizer.

8. The shears of claim 1, wherein the lubricant comprises grease.

9. The shears of claim 1, wherein the lubricant output conduit extends through the cutting blade insert member.

10. The shears of claim 1, wherein the lubricant output conduit is mounted to one of the jaws.

11. The shears of claim 1, wherein said lower jaw includes a cutting edge and said at least one wear part further comprises
a guide blade disposed opposite to said cutting edge.

12. The shears of claim 1, wherein said one of said jaws comprises the lower jaw.

13. A metal demolition shears, comprising:
a lower jaw and an upper jaw pivotally connected to said lower jaw, said lower and upper jaws including one or more wear parts with wear surfaces that shearingly interact with each other as said upper jaw pivots relative to said lower jaw during operation of said shears; and
a lubricating system configured and disposed so as to supply lubricant to at least one of said wear parts, said lubricating system comprising a lubricant pump, a lubricant supply, and a lubricant output conduit, said lubricant output conduit being supported by one of the jaws and extending from said lubricant pump, said lubricant pump receiving lubricant from said lubricant supply and pumping lubricant through said lubricant output conduit toward said at least one wear part,
wherein the at least one of said wear parts comprises a guide blade wherein said lower jaw includes a cutting edge and said guide blade is disposed opposite to said cutting edge, and
wherein the lubricant output conduit is at least partially defined by the guide blade.

14. The shears of claim 13, wherein the lubricant output conduit extends through the guide blade.

15. A metal demolition shears, comprising:
a first jaw and a second jaw, said first jaw and said second jaw being coupled for relative movement therebetween;
a first cutting blade insert member carried by the first jaw;
a second cutting blade insert member carried by the second jaw;
a lubricant output conduit carried by the first jaw and outputting lubricant for receipt by the first cutting blade insert member; and
a lubricant pump operatively connected with the lubricant output conduit for pumping the lubricant through the lubricant output conduit for receipt by the first cutting blade insert member,
wherein the lubricant output conduit is at least partially defined by the first cutting blade insert member.

16. The shears of claim 15, wherein the first jaw comprises a lower jaw.

17. The shears of claim 15, wherein the first and second cutting blade insert members shearingly interact with each other when the first and second jaws move relative to each other into a closed position.

18. The shears of claim 15, wherein the lubricant output conduit extends through the first cutting blade insert member.

* * * * *